(12) United States Patent
Li et al.

(10) Patent No.: US 12,043,403 B2
(45) Date of Patent: Jul. 23, 2024

(54) PROPELLER TRANSMISSION SYSTEM FOR AIRCRAFT POWERPLANT

(71) Applicant: CHONGQING ZONGSHEN AERO ENGINE MFG CO., LTD., Chongqing (CN)

(72) Inventors: Xingsheng Li, Chongqing (CN); Mingcheng Gong, Chongqing (CN); Zhong Tang, Chongqing (CN); Liping Pi, Chongqing (CN)

(73) Assignee: CHONGQING ZONGSHEN AERO ENGINE MFG CO., LTD., Chongqing (CN)

( * ) Notice: Subject to any disclaimer, the term of this patent is extended or adjusted under 35 U.S.C. 154(b) by 0 days.

(21) Appl. No.: 18/036,702

(22) PCT Filed: Nov. 11, 2021

(86) PCT No.: PCT/CN2021/130017
§ 371 (c)(1),
(2) Date: May 12, 2023

(87) PCT Pub. No.: WO2022/100654
PCT Pub. Date: May 19, 2022

(65) Prior Publication Data
US 2023/0391465 A1 Dec. 7, 2023

(30) Foreign Application Priority Data
Nov. 13, 2020 (CN) .......................... 202011265392.6

(51) Int. Cl.
*B64D 35/00* (2006.01)
*F16D 3/12* (2006.01)
*F16D 7/02* (2006.01)

(52) U.S. Cl.
CPC ............... *B64D 35/00* (2013.01); *F16D 3/12* (2013.01); *F16D 7/027* (2013.01); *F16D 2300/12* (2013.01); *F16D 2300/22* (2013.01)

(58) Field of Classification Search
CPC . B64D 35/00; F16D 3/12; F16D 7/027; F16D 2300/12; F16D 2300/22
(Continued)

(56) References Cited

U.S. PATENT DOCUMENTS 2,023,690 A * 12/1935 Lyman .................... F16D 43/08
192/70.17
4,585,105 A * 4/1986 Iio .......................... F16D 13/52
192/55.61
(Continued)

FOREIGN PATENT DOCUMENTS

CN 101610949 A 12/2009
CN 204691898 U 10/2015
(Continued)

*Primary Examiner* — Greg Binda
(74) *Attorney, Agent, or Firm* — Bayramoglu Law Offices LLC

(57) ABSTRACT

A propeller transmission system for an aircraft powerplant includes a propeller shaft. One end of the propeller shaft is a power input end, and the other end of the propeller shaft is configured to connect a propeller. The power input end of the propeller shaft is provided with a driven gear, and the driven gear is in transmission connection with an input end of an overload clutch. The propeller transmission system further includes a torsional damper, an output end of the overload clutch is in axial transmission connection with the torsional damper by a flexible disc, and the torsional damper is in transmission connection with the propeller shaft.

19 Claims, 4 Drawing Sheets

(58) Field of Classification Search
USPC .................. 192/55.1, 55.61, 70.17, 110 S
See application file for complete search history.

(56) References Cited

U.S. PATENT DOCUMENTS

| | | | |
|---|---|---|---|
| 6,200,223 | B1 | 3/2001 | Martens |
| 6,634,474 | B2 * | 10/2003 | Sasse ..................... F16H 45/02 |
| 7,959,512 | B2 | 6/2011 | Durand et al. |
| 2007/0216124 | A1 | 9/2007 | Wakabayashi et al. |
| 2016/0258494 | A1 | 9/2016 | Luipold et al. |
| 2016/0356340 | A1 | 12/2016 | Ito et al. |
| 2017/0276222 | A1 | 9/2017 | Takahashi et al. |

FOREIGN PATENT DOCUMENTS

| | | |
|---|---|---|
| CN | 205836529 U | 12/2016 |
| CN | 106697307 A | 5/2017 |
| CN | 210978284 U | 7/2020 |
| CN | 112373675 A | 2/2021 |
| EP | 3216700 A1 | 9/2017 |
| GB | 589281 A | 6/1947 |
| GB | 1161742 A | 8/1969 |
| JP | 2005273676 A | 10/2005 |
| KR | 20080016087 A | 2/2008 |

* cited by examiner

PROPELLER TRANSMISSION SYSTEM FOR AIRCRAFT POWERPLANT

CROSS REFERENCE TO THE RELATED APPLICATIONS

This application is the national phase entry of International Application No. PCT/CN2021/130017, filed on Nov. 11, 2021, which is based upon and claims priority to Chinese Patent Application No. 202011265392.6, filed on Nov. 13, 2020, the entire contents of which are incorporated herein by reference.

TECHNICAL HELD

The present disclosure relates to a transmission system, and in particular, to a propeller power system for an aircraft powerplant.

BACKGROUND

An aircraft powerplant includes power systems of helicopters, unmanned aerial vehicles, or various aircrafts. In an engine transmission mechanism, the power is transmitted from a main transmission shaft (crankshaft) to a driving gear, then the driving gear drives a driven gear to rotate, and finally the rotation of the driven gear is transmitted to a rotating member (a propeller shaft, a driving flange, etc.) by a propeller shaft. On existing driven teeth, a clutch is often mounted on the rotating member, and the clutch is connected to the rotating member by a spline. When the rotating member is subjected to an external force that exceeds what the member can bear during power transmission, the clutch and the rotating member are temporarily separated from a rotating direction, that is, the clutch and a rotating shaft slip, so as to prevent rotating components (including the propeller shaft, a driving shaft, etc.) from being damaged by impact. In order to prevent the rotating shaft, from being damaged, a clutch slip torsional moment needs to be designed reasonably.

In addition, in existing propeller transmission systems, a vibration damping system is generally arranged on or outside a case body, and a vibration source or power source of a propeller transmission system directly transmits the vibration to a transmission case, which shortens the service life of the transmission case and reduces noise, vibration and harshness (NVH) performance of the transmission case. In addition, the external vibration damping system increases the dimensional space and weight of the transmission system.

SUMMARY

An objective of the present disclosure is to provide a propeller transmission system for an aircraft powerplant, which has high safety and small volume.

To achieve the above objective, the present disclosure is arranged as follows: A propeller transmission system for an aircraft powerplant includes a propeller shaft, where one end of the propeller shaft is a power input end, and the other end of the propeller shaft is configured to connect a propeller, the power input end of the propeller shaft is provided with a driven gear, the driven gear is in transmission connection with an input end of an overload clutch, the propeller transmission system further includes a torsional damper, an output end of the overload clutch is in axial transmission connection with the torsional damper by a flexible disc, and the torsional damper is in transmission connection with the propeller shaft. The above combination of the overload clutch and the torsional damper not only enables the propeller transmission system to have vibration damping performance and realize torque overload protection, but also can reduce the design space and dimension, and achieve better NVH performance and service life.

To further reduce the radial dimension, the propeller shaft is sleeved with a disc hub core of the overload clutch, an end of the disc hub core is axially limited, the driven gear is fixedly connected to the disc hub core of the overload clutch, and a driven friction plate of the overload clutch is splined with a sleeve part of the flexible disc.

To further reduce the radial dimension and improve the vibration damping effect, the flexible disc includes the sleeve part, an end of the sleeve part is provided with a disc-shaped part, and the disc-shaped part is fixedly connected to a clamping disc of the torsional damper.

In order to further realize the rotation of the propeller shaft, a disc hub core of the torsional damper is splined with the propeller shaft.

In order to further transmit greater torque, an outer ring of the disc-shaped part of the flexible disc is fixedly connected to an outer ring of the clamping disc of the torsional damper.

In order to further transmit greater torque, the outer ring of the disc-shaped part of the flexible disc is riveted to the outer ring of the clamping disc of the torsional damper.

Preferably, a rear end face of the disc hub core of the overload clutch is axially limited by a shaft sleeve fixed to the propeller shaft.

In order to further protect the propeller shaft from damage, an end of the propeller shaft configured to connect the propeller is provided with a shaft shoulder, an isolation ring is arranged at the shaft shoulder, the isolation ring axially limits a front end face of the disc hub core of the torsional damper, and the isolation ring is in cambered surface contact with the shaft shoulder. In the case of use of the isolation ring, the isolation ring tends to become larger due to an oblique force when subjected to a maximum axial force that exceeds what the system can bear. When the maximum axial force exceeds the force that the isolation ring can bear, the isolation ring is damaged to protect the propeller shaft from damage.

In order to further reduce an axial length, a bearing for supporting a case body is arranged between the isolation ring and the front end face of the disc hub core of the torsional damper, and a bushing is arranged between the bearing and the front end face of the disc hub core of the torsional damper.

The torsional damper in the present disclosure has a torsional angle of 30°, and has large-margin vibration damping performance.

Advantages

1. According to the present disclosure, the torsional damper is in axial series connection with the overload clutch by the flexible disc, and an overload protection function and vibration damping performance are integrated in an existing propeller transmission case, thereby improving the WEI performance and prolonging the service life of the propeller transmission system. In addition, the radial space volume and weight of propeller transmission system are reduced. The connection by the flexible disc can not only integrate the overload function and the vibration damping function, but also realize transmission of higher torque, improve the reliability of the structure, and reduce the radial dimension of the structure.

2. The transmission system according to the present disclosure has a small weight and small dimension, is easy to arrange, and has great advantages for mechanical arrangement sensitive to dimension and weight.

3. Through the design of the isolation ring, not only can the torsional damper be limited, but also a function of impact protection can be achieved.

Reference signs: 1: propeller shaft, 11: shaft shoulder, 2: driven gear, 3: overload clutch, 31: disc hub core of the overload clutch, 32: friction plate of the overload clutch, 4: flexible disc, 41: sleeve part, 42: disc-shaped part, 43: lightening hole, 5: rivet, 6: torsional damper, 61: disc hub core of the torsional damper, 62: clamping disc, 7: shaft sleeve, 8: isolation ring, 9: bearing, 10: bushing, 12: elastic bushing, 13: first case body, 14: second case body, 15: inner shaft, 16: oil seal, 17: oil inlet hole.

DETAILED DESCRIPTION OF THE EMBODIMENTS

Specific implementations of the present disclosure will be further described in detail with reference to the accompanying drawings, but the present disclosure is not limited to these implementations, and any improvement or substitution based on the basic spirit of the embodiments still falls within the scope of the claims of the present disclosure.

Figure 1:
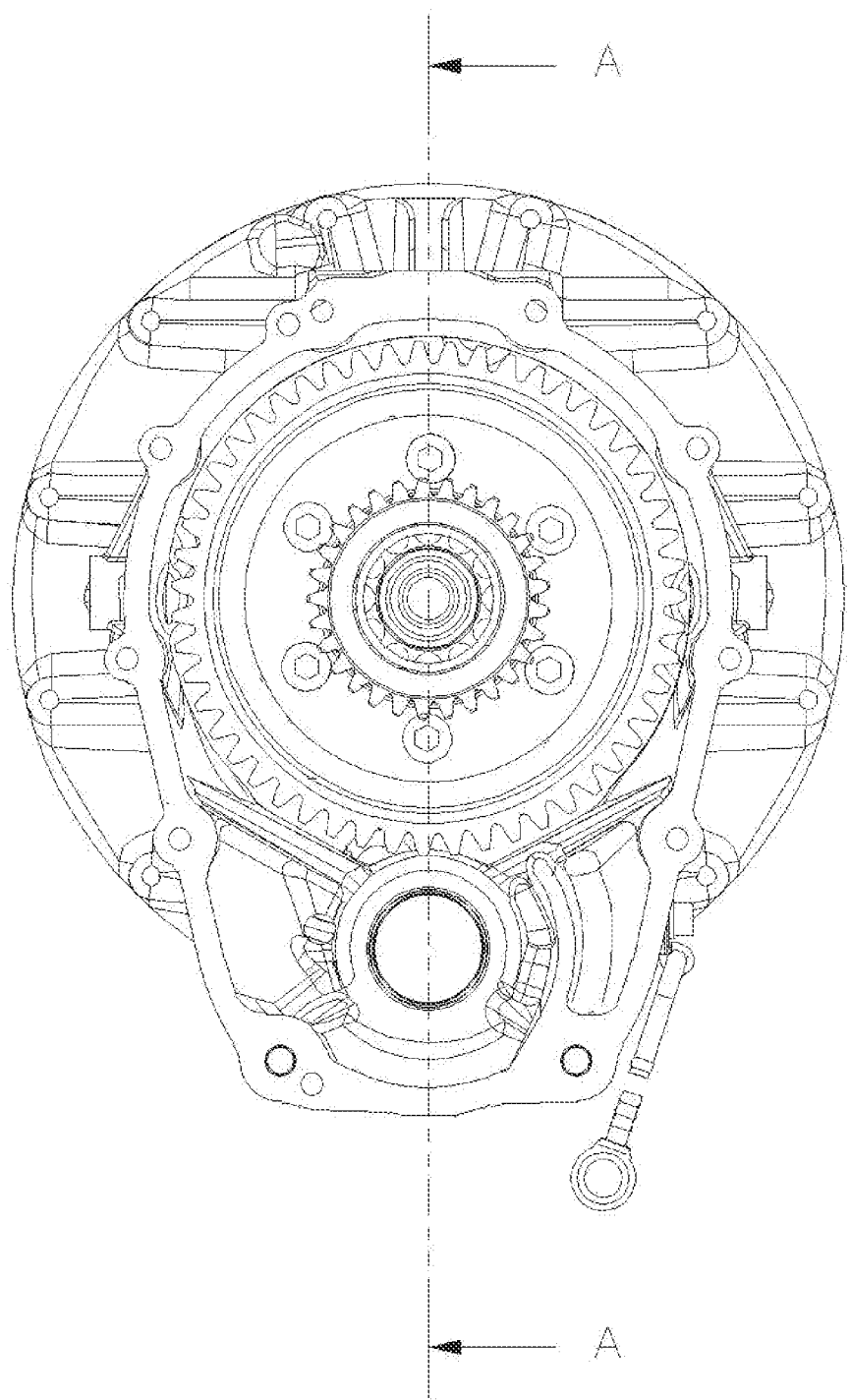
FIG. 1 is a front view of a propeller transmission system in an embodiment.
Figure 2:
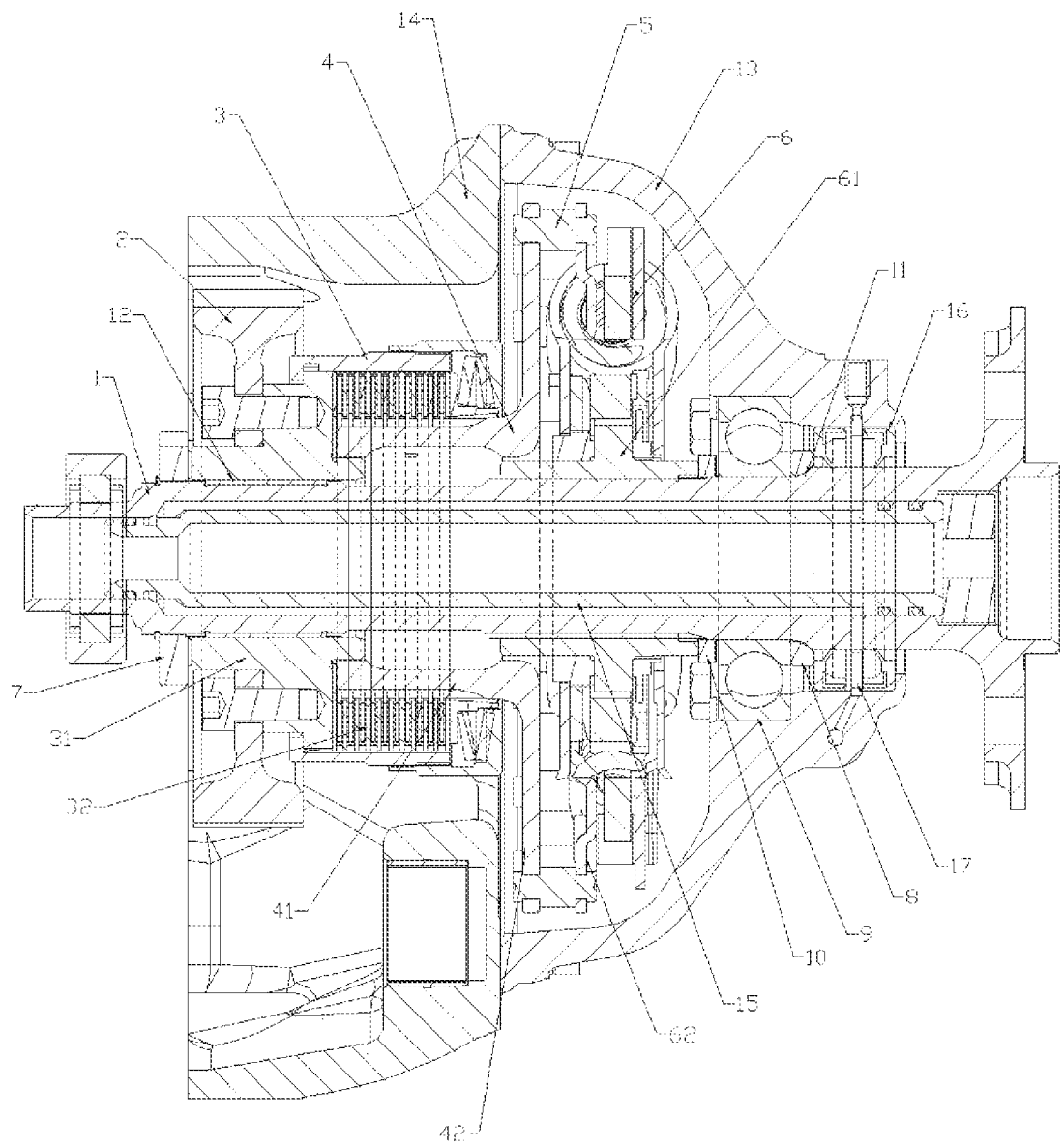
FIG. 2 is a cross-sectional view taken along line A-A shown in FIG. 1.
Figure 3:
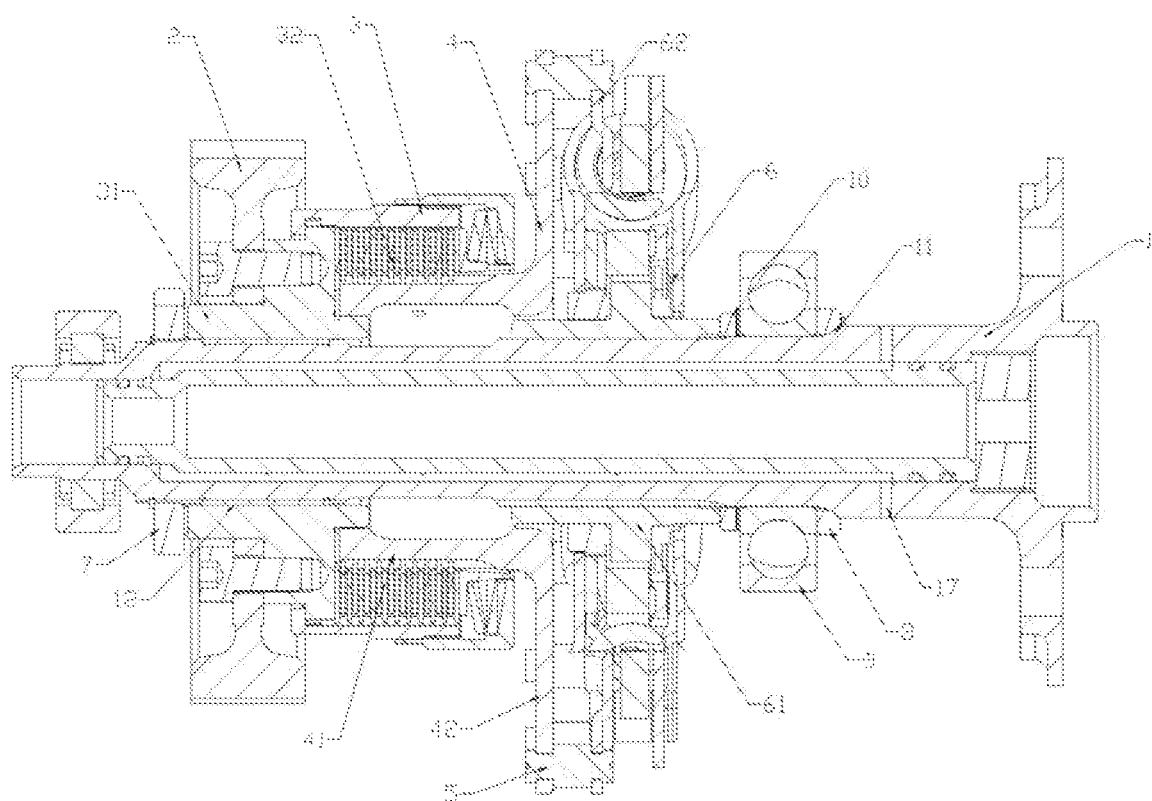
FIG. 3 is a cross-sectional view taken along line A-A shown in FIG. 1 (including no case body)
Figure 4:
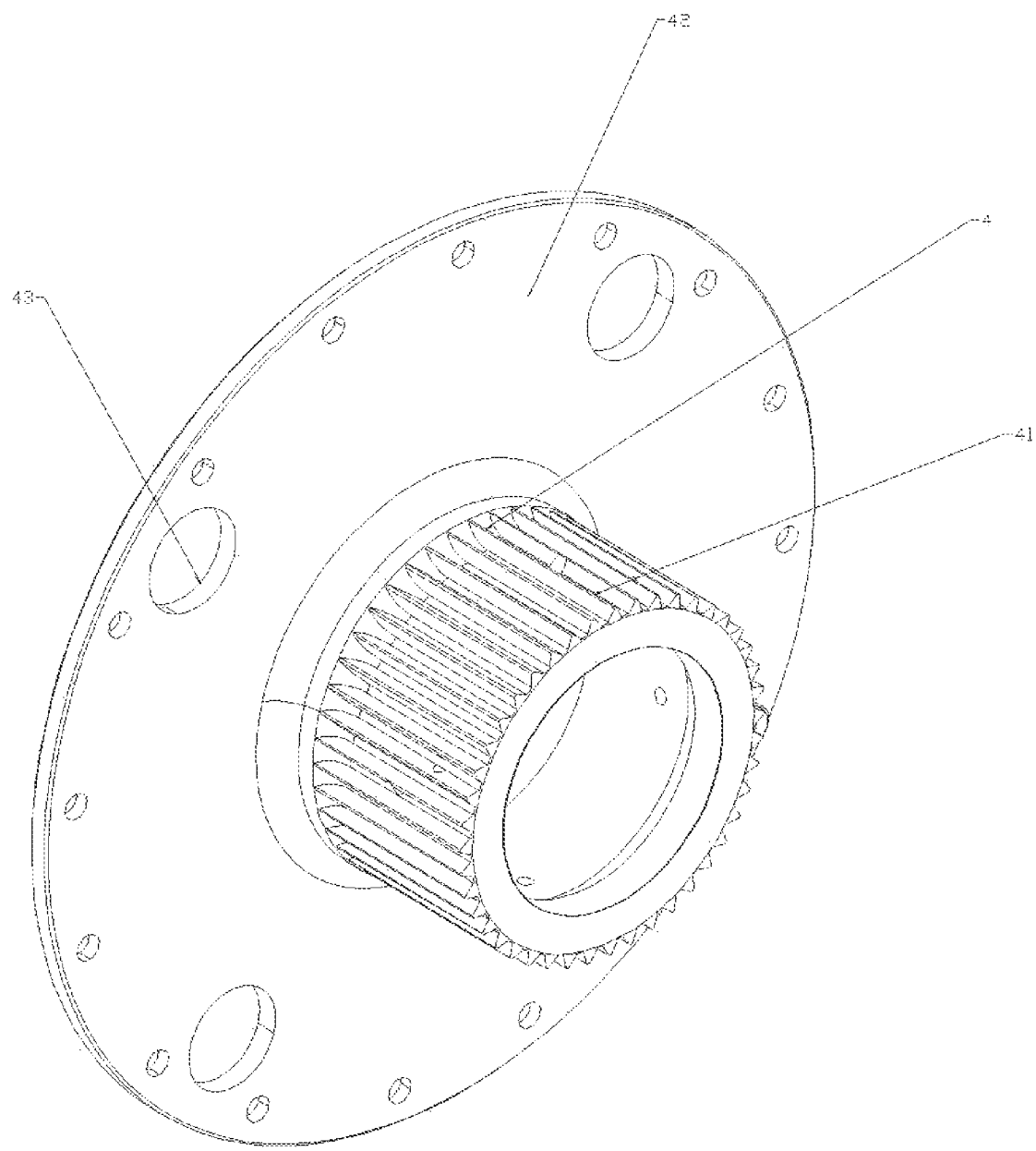
FIG. 4 is an axonometric view of a flexible disc.

Embodiment: As shown in FIG. 1 to FIG. 4, this embodiment provides a propeller transmission system for an aircraft powerplant, e.g., an aircraft such as an unmanned aerial vehicle and a helicopter. The propeller transmission system for an aircraft powerplant includes propeller shaft 1, where one end of the propeller shaft is a power input end, and the other end of the propeller shaft is configured to connect a propeller, the power input end of the propeller shaft is provided with driven gear 2, the driven gear is in transmission connection with an input end of overload clutch 3, the propeller transmission system further includes torsional damper 6, an output end of the overload clutch is in axial transmission connection with the torsional damper by flexible disc 4, and the torsional damper is in transmission connection with the propeller shaft.

The driven gear receives power from a driving gear and transmits the power to the overload clutch, the overload clutch transmits the power to the torsional damper by means of the flexible disc, and the torsional damper finally transmits the power to the propeller shaft. In this process, the overload clutch provides the function of overload protection, and the torsional damper provides the function of damping the transmitted power and uniformizing torque.

In this embodiment, the driven gear meshes with the driving gear, and the driving gear is in transmission connection with a driving shaft or a crankshaft of an engine, and the power outputted by the engine is transmitted to the driven gear on the propeller shaft through gear meshing. The driven gear is fixedly connected to the input end of the overload clutch mounted on the propeller shaft and transmits power to the overload clutch. The flexible disc 4 includes sleeve part 41 and disc-shaped part 42. The disc-shaped part is arranged on an end face of the sleeve part. The propeller shaft is sleeved with the sleeve part, a spline is provided on an outer wall of the sleeve part, and friction plate 32 of the overload clutch is splined with the outer wall of the sleeve part of the flexible disc. Therefore, the power is transmitted to the flexible disc through the splined connection between the overload clutch and the flexible disc. The disc-shaped part of the flexible disc is connected to the torsional damper, and the torsional damper includes clamping disc 62 and disc hub core 61. The disc-shaped part of the flexible disc is fixedly connected to the clamping disc of the torsional damper, and the disc hub core of the torsional damper is splined with the propeller shaft. The clamping disc of the torsional damper is driven to rotate during rotation of the flexible disc, and a spring is compressed during rotation of the clamping disc of the torsional damper, so that the buffer of the spring can absorb the vibration and uniformize the torque.

In this embodiment, the propeller shaft is sleeved with disc hub core 31 of the overload clutch, an end of the disc hub core is axially limited, and the disc hub core of the overload clutch is sleeved with the driven gear with an end face fixedly connected to the disc hub core of the overload clutch by a screw or other means. Moreover, elastic bushing 12 is arranged on the propeller shaft, and the elastic bushing is sleeved with the disc hub core of the overload clutch, so that the wear on the propeller shaft can be reduced. An end face of the disc hub core of the overload clutch, which is far away from the propeller shaft and is provided with the propeller, is axially limited by shaft sleeve 7 or other means.

An overload force value of the overload clutch is preset according to engine power. The sleeve part of the flexible disc has a length greater than that of the friction plate of the overload clutch, and a gasket is further arranged between the end face of the sleeve part of the flexible disc and the end face of the disc hub core of the overload clutch.

An outer ring of the disc-shaped part of the flexible disc is fixedly connected to an outer ring of the clamping disc of the torsional damper. In this embodiment, the outer ring of the disc-shaped part of the flexible disc is fixedly connected to the outer ring of the clamping disc of the torsional damper in a riveted manner by multi-point uniform rivets 5 in a circumferential direction.

In addition, an end of the torsional damper facing the mounted propeller is also axially limited. Specifically, an end of the propeller shaft configured to connect the propeller is provided with shaft shoulder 11, isolation ring 8 is arranged at the shaft shoulder, the isolation ring axially limits a front end face of the disc hub core of the torsional damper, and the isolation ring is in cambered surface contact with the shaft shoulder. In the case of use of the isolation ring, not only can the torsional damper be axially limited, but also the isolation ring tends to become larger due to an oblique force when subjected to a maximum axial force that exceeds what the system can bear. When the maximum axial force exceeds the force that the isolation ring can bear, the isolation ring is damaged to protect the propeller shaft from damage.

In another implementation of this embodiment, bearing 9 for supporting a case body is arranged between the isolation ring and the front end face of the disc hub core of the torsional damper, and bushing 10 is arranged between the bearing and the front end face of the disc hub core of the torsional damper.

In addition, the torsional damper in this embodiment is a damper with a conventional structure purchasable in the market, but the torsional damper in this embodiment has a torsional angle of 30°, that is, an angle at which the spring is compressed can reach 30°, thereby achieving large-margin vibration damping performance. The overload clutch is also an overload clutch with a conventional structure purchasable in the market.

In another implementation of this embodiment, the flexible disc is provided with lightening hole 43.

In addition, in another implementation of this embodiment, the case body of the transmission system is split, and includes front first case body 13 and rear second case body 14. Case dividing surfaces of the first case body and the second case body are rear surfaces of the flexible disc. The first case body is connected to the second case body by a screw During mounting, the torsional damper and the flexible disc can be mounted into the first case body, then the first case body and the second case body are assembled and fixed, and then the overload clutch and driven teeth are mounted in the second case body.

In another implementation of this embodiment, the propeller shaft is a hollow shaft, an inner shaft 15 is arranged in the propeller shaft, an oil cavity is formed between the inner shaft and the propeller shaft, an end portion of the oil cavity is provided with an oil inlet hole, the oil inlet hole 17 is provided in the propeller shaft and communicates with an external oil path, two oil seals 16 are provided at the oil inlet hole, and an oil inlet chamber is formed by the two oil seals. The oil cavity is provided with a plurality of lubricating oil holes, which are provided in the propeller shaft, and the lubricating oil holes are opposite to places on the propeller shaft where other components are assembled. For example, the lubricating oil holes are configured to convey lubricating oil to the overload clutch, the driven gear, the torsional damper, etc. An oil passage may be further provided on the flexible disc, and components such as the friction plate of the overload clutch are lubricated through the oil passage.

The propeller shaft in the present disclosure takes the propeller end as the front and the power input end as the back.

In this embodiment, the torsional damper is in axial series transmission connection with the overload clutch by the flexible disc, and an overload protection function and vibration damping performance are integrated in an existing propeller transmission case, thereby improving the NVH performance and prolonging the service life of the propeller transmission system. In addition, the radial space volume and weight of propeller transmission system are reduced. The connection by the flexible disc can not only integrate the overload function and the vibration damping function, but also realize transmission of higher torque, improve the reliability of the structure, and reduce the radial dimension of the structure.

In addition, the transmission system according to the present disclosure has a small weight and small dimension, is easy to arrange, and has great advantages for mechanical arrangement sensitive to dimension and weight.

Moreover, through the design of the isolation ring, not only can the torsional damper be limited, but also a function of impact protection can be achieved.

What is claimed is:

1. A propeller transmission system for an aircraft powerplant, comprising a propeller shaft, wherein one end of the propeller shaft is a power input end, and the other end of the propeller shaft is configured to connect a propeller,
   the power input end of the propeller shaft is provided with a driven gear, the driven gear is in transmission connection with an input end of an overload clutch,
   the propeller transmission system further comprises a torsional damper, an output end of the overload clutch is in axial transmission connection with the torsional damper by a flexible disc, and the torsional damper is in transmission connection with the propeller shaft; and
   the flexible disc comprises a sleeve part, an end of the sleeve part is provided with a disc-shaped part, and the disc-shaped part is fixedly connected to a clamping disc of the torsional damper,
   wherein the propeller shaft is sleeved with a disc hub core of the overload clutch, an end of the disc hub core is axially limited, the driven gear is fixedly connected to the disc hub core of the overload clutch, and a driven friction plate of the overload clutch is splined with a spline on an outer wall of the sleeve part of the flexible disc.

2. The propeller transmission system for an aircraft powerplant according to claim 1, wherein a disc hub core of the torsional damper is splined with the propeller shaft.

3. The propeller transmission system for an aircraft powerplant according to claim 2, wherein an outer ring of the disc-shaped part of the flexible disc is fixedly connected to an outer ring of the clamping disc of the torsional damper.

4. The propeller transmission system for an aircraft powerplant according to claim 3, wherein the outer ring of the disc-shaped part of the flexible disc is riveted to the outer ring of the clamping disc of the torsional damper.

5. The propeller transmission system for an aircraft powerplant according to claim 3, wherein a rear end face of the disc hub core of the overload clutch is axially limited by a shaft sleeve fixed to the propeller shaft.

6. The propeller transmission system for an aircraft powerplant according to claim 2, wherein a rear end face of the disc hub core of the overload clutch is axially limited by a shaft sleeve fixed to the propeller shaft.

7. The propeller transmission system for an aircraft powerplant according to claim 2, wherein an end of the propeller shaft configured to connect the propeller is provided with a shaft shoulder, an isolation ring is arranged at the shaft shoulder, the isolation ring axially limits a front end face of the disc hub core of the torsional damper, and the isolation ring is in cambered surface contact with the shaft shoulder.

8. The propeller transmission system for an aircraft powerplant according to claim 7, wherein a bearing for supporting a case body is arranged between the isolation ring and the front end face of the disc hub core of the torsional damper, and a bushing is arranged between the bearing and the front end face of the disc hub core of the torsional damper.

9. The propeller transmission system for an aircraft powerplant according to claim 8, wherein the torsional damper has a torsional angle of 30°.

10. The propeller transmission system for an aircraft powerplant according to claim 2, wherein the torsional damper has a torsional angle of 30°.

11. The propeller transmission system for an aircraft powerplant according to claim 1, wherein an end of the propeller shaft configured to connect the propeller is provided with a shaft shoulder, an isolation ring is arranged at the shaft shoulder, the isolation ring axially limits a front end face of a disc hub core of the torsional damper, and the isolation ring is in cambered surface contact with the shaft shoulder.

12. The propeller transmission system for an aircraft powerplant according to claim 11, wherein a bearing for supporting a case body is arranged between the isolation ring and the front end face of the disc hub core of the torsional damper, and a bushing is arranged between the bearing and the front end face of the disc hub core of the torsional damper.

13. The propeller transmission system for an aircraft powerplant according to claim 11, wherein the torsional damper has a torsional angle of 30°.

14. The propeller transmission system for an aircraft powerplant according to claim 1, wherein the torsional damper has a torsional angle of 30°.

15. The propeller transmission system for an aircraft powerplant according to claim 1, wherein a rear end face of the disc hub core of the overload clutch is axially limited by a shaft sleeve fixed to the propeller shaft.

16. The propeller transmission system for an aircraft powerplant according to claim 15, wherein an end of the propeller shaft configured to connect the propeller is provided with a shaft shoulder, an isolation ring is arranged at the shaft shoulder, the isolation ring axially limits a front end face of the disc hub core of the torsional damper, and the isolation ring is in cambered surface contact with the shaft shoulder.

17. The propeller transmission system for an aircraft powerplant according to claim 15, wherein the torsional damper has a torsional angle of 30°.

18. The propeller transmission system for an aircraft powerplant according to claim 1, wherein a disc hub core of the torsional damper is splined with the propeller shaft.

19. The propeller transmission system for an aircraft powerplant according to claim 1, wherein a rear end face of the disc hub core of the overload clutch is axially limited by a shaft sleeve fixed to the propeller shaft.

* * * * *